(12) United States Patent
Adamczyk et al.

(10) Patent No.: US 8,939,462 B2
(45) Date of Patent: Jan. 27, 2015

(54) TRAILER TOWING DEVICE FOR A TRACTOR VEHICLE

(75) Inventors: Dirk Adamczyk, Lemforde (DE); Julian Stratmann, Osnabruck (DE); Christoph Elbers, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/529,073

(22) Filed: Jun. 21, 2012

(65) Prior Publication Data

US 2013/0001924 A1 Jan. 3, 2013

(30) Foreign Application Priority Data

Jun. 29, 2011 (DE) .......................... 10 2011 078 329

(51) Int. Cl.
*B60D 1/06* (2006.01)
(52) U.S. Cl.
CPC ....................................... *B60D 1/06* (2013.01)
USPC ........................................................ 280/511
(58) Field of Classification Search
CPC ............. B60D 1/065; B60D 1/06; B60D 1/52
USPC ......................................... 280/511, 512, 513
See application file for complete search history.

(56) References Cited

U.S. PATENT DOCUMENTS

| | | | | |
|---|---|---|---|---|
| 4,273,461 A | * | 6/1981 | Kjellstrand et al. | 403/125 |
| 5,871,222 A | * | 2/1999 | Webb | 280/511 |
| 6,879,240 B2 | * | 4/2005 | Kruse | 338/12 |
| 7,393,152 B2 | * | 7/2008 | Sellers et al. | 403/135 |
| 7,878,525 B2 | * | 2/2011 | Andersen | 280/439 |

FOREIGN PATENT DOCUMENTS

DE  103 34 000 A1  2/2005

OTHER PUBLICATIONS

DE 103 34 000 A1, Altsinger et al., Feb. 24, 2005, "Vehicle tow bar coupling has coupling head with integrated permanent magnet sensor to measure relative motion of coupled drawbar" (Machine Translation).*

* cited by examiner

*Primary Examiner* — Joseph Rocca
*Assistant Examiner* — Felicia L Brittman
(74) *Attorney, Agent, or Firm* — Davis & Bujold, PLLC; Michael J. Bujold

(57) ABSTRACT

A trailer towing device for a tractor vehicle (1) which comprises a coupling ball (11), having a hollow space (21) for coupling a trailer vehicle (2), and a ball support (17) which engages with an end area in the hollow space (21) through an opening (22) provided in the coupling ball (11) and supports the coupling ball (11), such that the end area of the ball support (17) comprises a joint ball (15) on which the coupling ball (11) is fitted and can rotate so that, together with the coupling ball (11), the joint ball forms a ball joint (28).

18 Claims, 6 Drawing Sheets

TRAILER TOWING DEVICE FOR A TRACTOR VEHICLE

This application claims priority from German patent application Ser. no. 10 2011 078 329.6 filed Jun. 29, 2011.

FIELD OF THE INVENTION

The invention concerns a trailer towing device for a tractor vehicle, with a coupling ball having a hollow space for coupling a trailer vehicle and a ball support, which engages in the hollow space with one end area through an opening provided in the coupling ball and which supports the coupling ball.

BACKGROUND OF THE INVENTION

DE 103 34 000 A1 describes a trailer coupling for a tractor vehicle, with a coupling head for attaching a coupling counterpart of a trailer vehicle, a coupling shaft which is connected to the tractor vehicle and which, in the area of the coupling head, defines a vertical axis, and an angle sensor which is integrated in the trailer coupling and which registers movement of the coupling counterpart relative to the coupling shaft about the vertical axis. The coupling head is mounted so that by virtue of a roller bearing arranged in the coupling head, it can rotate relative to the coupling shaft about the vertical axis. In this case, the friction of the roller bearing is negligibly small compared with the friction between the coupling head and the coupling counterpart.

Mounting by means of a roller bearing is relatively elaborate. In particular, owing to the small diameter of the coupling head only little structural space is available for integrating the roller bearing, which as a rule comprises many moving parts, in the coupling head, which has to withstand large forces during trailer towing operation and can therefore only be made smaller to a limited extent at acceptable cost. Furthermore, roller bearings are also sensitive to point loading that often occurs during trailer towing operation, so that such bearings undergo premature wear.

SUMMARY OF THE INVENTION

Starting from there the purpose of the present invention, with a trailer towing device of the type mentioned at the beginning, is to enable a load-resistant mounting of the coupling ball on the ball support which can be integrated comparatively simply into the hollow space.

This objective is achieved by a trailer towing device according to the description below.

The trailer towing device for a tractor vehicle comprises a coupling ball with a hollow space for coupling a trailer vehicle, and a ball support which engages in the hollow space with one end area through an opening provided in the coupling ball and which supports the coupling ball, such that the end area of the ball support comprises a joint ball over which the coupling ball fits and can rotate so that this, together with the coupling ball, form a ball joint.

The ball joint is of relatively simple structure, robust and load-resistant. In particular the ball joint is comparatively insensitive to point loads. The mounting for the coupling ball can also be integrated in the hollow space relatively simply.

The ball support preferably forms or comprises a ball pin of the ball joint with the joint ball. Furthermore, the coupling ball preferably forms a housing or ball seating of the ball joint. The mid-point of the joint ball preferably coincides with the mid-point of the coupling ball. In particular, the ball joint has at least one or at least two rotational degrees of freedom. Advantageously, the ball joint has three rotational degrees of freedom.

The joint ball is preferably attached firmly, in particular solidly to the ball support. Preferably the joint ball is made integrally and/or material-homogeneously with the ball support. However, the joint ball and the ball support can also be separate components connected to one another firmly, in particular solidly or in a rotationally fixed manner. The ball support is preferably made of metal, in particular steel. Moreover the joint ball is preferably metallic, in particular made of steel.

The ball support can be curved or angled. However, the ball support is preferably straight or substantially so. This can be advantageous for production technology reasons. In particular the ball support has a pin area (pin) adjacent to the joint ball. Preferably, the ball support with its pin area projects out of the coupling ball.

In one design the trailer towing device comprises a holder to which the ball support is connected firmly, in particular solidly. In particular the ball support with its pin area is attached to the holder. The holder can be straight, angled or curved. Moreover, the holder can comprise or form a ball support housing, in which the ball support, in particular with its pin, is arranged and/or fixed. The ball support housing is preferably connected firmly, in particular solidly to the holder. Preferably, the ball support housing is made integrally and/or material-homogeneously with the holder. However, the ball support housing and the holder can also be separate components connected firmly, in particular solidly to one another. Preferably the holder forms a coupling arm. The holder is preferably made of metal, in particular, steel.

The ball support can be connected non-detachably with the holder. Advantageously, however, the ball support is connected detachably to the holder. In particular the ball support is fixed in the ball support housing so that it can be taken out. In this way for example, the ball support can be replaced.

Associated with the trailer towing device, in particular the ball support, is preferably a vertical axis which preferably extends in the direction of the vertical axis of the tractor vehicle. In particular the vertical axis passes through the mid-point of the joint ball and/or through the mid-point of the coupling ball. Advantageously, in the direction of the vertical axis the ball support is straight or substantially straight. Preferably, the ball support with its joint ball extend upward in the direction of the vertical axis.

The coupling ball is mounted to rotate on the joint ball, in particular or at least about the vertical axis. Thus, the coupling ball can preferably rotate about the joint ball, about the vertical axis or at least about the vertical axis. Advantageously however, the coupling ball is mounted to rotate on the joint ball about a plurality, for example about two, or three, or any number of axes, which in particular pass through the mid-point of the joint ball and/or through the mid-point of the coupling ball, one of the axes preferably being the vertical axis. Preferably therefore, the coupling ball can rotate on the joint ball about any axis that passes through the mid-point of the joint ball and/or the coupling ball. Rotation of the coupling ball on the joint ball about an axis that does not coincide with the vertical axis is also referred to as tilting. The coupling ball is preferably made of metal, in particular steel. Advantageously, the coupling ball is permanently connected to the ball support. Alternatively however, the coupling ball can also be taken off the ball support.

Inside the hollow space there is preferably provided a hollow-ball-shaped bearing surface. In addition, the joint ball preferably has a ball-shaped bearing surface against which the hollow-ball-shaped bearing surface rests and on which it can slide. The ball-shaped bearing surface is in particular an outer surface of the joint ball. The coupling ball can be mounted to rotate directly on the joint ball. In that case the hollow-ball-shaped bearing surface is formed in particular by a wall of the coupling ball that delimits the hollow space. Preferably however, the coupling ball is mounted to rotate on the joint ball with a bearing shell interposed between them. In that case the bearing shell in particular constitutes the hollow-ball-shaped bearing surface. The bearing shell is preferably arranged in the hollow space and is preferably fixed on the coupling ball. Thus, when the coupling ball rotates about the joint ball the bearing shell preferably rotates together with the coupling ball. Advantageously, the bearing shell is connected to the coupling ball solidly or in a rotationally fixed manner. For example, the bearing shell is secured in the hollow space by means of a locking element, in particular one that is ring-shaped and through which the ball support preferably extends. The locking element preferably has a fixed connection to the coupling ball. In particular, the locking element engages with the coupling ball with positive interlock. The use of the bearing shell offers for example the advantage of being able to adjust the friction between the coupling ball and the joint ball relatively simply to a desired value, for example by selecting a suitable material for the bearing shell. In particular this material can be selected independently of the material for the coupling ball, which as a rule has to meet requirements other than the bearing shell. Preferably, the bearing shell and the coupling ball are made of different materials. For example, the bearing shell is comprised of plastic or metal. In particular the bearing shell consists of polyoxymethylene (POM), polyetheretherketone (PEEK), polyamide (PA), sintered bronze, or some other suitable material. Advantageously, the bearing shell and/or the coupling ball encloses the joint ball. The bearing shell can be made in one or more parts, for example two parts.

Preferably the trailer towing device comprises a seal or at least one seal arranged in the area of the opening in the coupling ball and advantageously extending between the coupling ball and the ball support. By means of the seal, in particular the bearing surfaces are protected from impurities and moisture. For example the seal is fixed on the coupling ball, on the bearing shell or on the locking element, preferably bonded or vulcanized thereto. It is also possible, however, for the seal to be fixed, preferably bonded or vulcanized, on the ball support, on the joint ball, or on the holder. Advantageously, the seal makes sealing contact with the ball support and/or the joint ball and/or the coupling ball and/or the bearing shell and/or the locking element and/or the holder. The seal can for example be a sealing bellows and/or can comprise or form one or more sealing lips.

The ball support or the holder is preferably configured for fixing firmly to a, or to the tractor vehicle. Preferably the ball support or holder is or can be connected firmly to the tractor vehicle. In particular, the ball support or the holder is or can be connected firmly, in particular solidly, to a vehicle body or chassis of the tractor vehicle.

The coupling ball is preferably configured for coupling to a coupling lock of a, or of the trailer vehicle. Advantageously, the coupling ball is or can be coupled to the coupling lock of the trailer vehicle. The condition in which the coupling lock is coupled with the coupling ball is also referred to as the coupled condition. Further, the condition in which the coupling lock is not coupled to the coupling ball is referred to as the uncoupled condition. In the coupled condition the coupling ball engages in particular in a ball seating of the coupling lock and is secured therein with positive interlock.

In the coupled condition the friction, in particular the static friction and/or the sliding friction between the joint ball and the coupling ball is preferably lower than the friction, in particular the static friction and/or sliding friction between the coupling ball and the coupling lock. In the coupled condition, in relation to rotation of the coupling lock about the joint ball, the coupling lock and the coupling ball are preferably held together by friction force. In particular, this frictional connection is effective in relation, or at least in relation, to rotation of the coupling ball around the joint ball about the vertical axis. Preferably, the frictional connection also acts in relation to rotation of the coupling ball around the joint ball about one, more than one, or any number of other axes which do not coincide with the vertical axis and which, in particular, pass through the mid-point of the joint ball and/or through the mid-point of the coupling ball. Thus, the coupling ball preferably follows the movements of the coupling lock. In particular, between the coupling lock and the coupling ball there is no relative movement, or only rarely so. Thus, it is also possible to avoid or reduce the noises that occur in conventional trailer couplings due to relative movements between the coupling lock and the coupling ball.

In a further development, the trailer towing device comprises an angle detection device by means of which movement, in particular rotation of the coupling ball around the joint ball can be detected. Preferably, by means of the angle detection device rotation of the coupling ball around the joint ball about the vertical axis, or about a number of axes can be detected, one of them being in particular the vertical axis. If the trailer vehicle is coupled to the coupling ball, then by means of the angle detection device, the articulation angle of the tractor-trailer combination formed by the tractor vehicle and the trailer vehicle can advantageously be determined. The articulation angle is in particular the angle enclosed between the respective longitudinal axes of the tractor and the trailer, preferably in a plane perpendicular to the vertical axis and/or to the vertical axis of the tractor vehicle. The articulation angle preferably corresponds to an angle through which the coupling ball has rotated on the joint ball about the vertical axis, in particular in the coupled condition. If the coupling ball has several degrees of rotational freedom and if it is desired only to determine the articulation angle, it is advantageous for the angle detection device only to detect the articulation angle and in this, not to be influenced by the other degrees of rotational freedom of the coupling ball. According to a possible design, however, besides rotation of the coupling ball around the joint ball about a vertical axis, the angle detection device can also detect rotation of the coupling ball around the joint ball about one, or about at least one, for example two or three, or about several or indeed any number of other axes, which do not coincide with the vertical axis and in particular which pass through the mid-point of the joint ball and/or through the mid-point of the coupling ball.

The angle detection device is preferably arranged within the trailer towing device. In particular, the angle detection device is arranged within one or more structural elements or within one or more assemblies of the trailer towing device, for example within the ball joint or the ball support housing. In this way the angle detection device can be protected effectively against environmental influences such as dirt and water. Advantageously, no components of the angle detection device are provided on the trailer vehicle itself. In this way an overall more compact structure of the angle detection device can be produced. External disturbing influences on the angle detection device can also be kept small, so that the angle detection device can operate in a relatively robust manner.

Preferably, the angle detection device comprises a first component connected to or provided on the coupling ball and a second component connected to the ball support or the holder or provided on it or them, in particular such that the second component interacts with the first component. Advantageously, the first component is connected solidly or in a rotationally fixed manner to the coupling ball. In addition, advantageously the second component is connected solidly or in a rotationally fixed manner to the ball support or the holder. In particular, the two components are opposite one another.

Preferably, the angle detection device works without contact. In particular this is understood to mean that the two components of the angle detection device are not in contact with one another. For example, the angle detection device works magnetically, inductively or optically. If the angle detection device works optically, then one of the components preferably comprises an optical sensor and another of the components preferably a reflecting surface. In addition the optical angle detection device preferably comprises a light source by which the reflecting surface can be lit, whereby the light reflected at the reflecting surface can be detected by the optical sensor. In particular, the component with the optical sensor also comprises the light source.

Preferably, the angle detection device works magnetically. In particular, one of the components comprises or is a magnet and another of the components comprises a sensor sensitive to magnetic fields, through which the magnetic field of the magnet advantageously flows. In particular the magnet and the magnetic-field-sensitive sensor are orientated relative to one another in such manner that the magnetic-field-sensitive sensor can detect rotation of the coupling ball about the vertical axis, around the joint ball. Preferably, the magnet and the magnetic-field-sensitive sensor are so orientated relative to one another that the magnetic-field-sensitive sensor can detect rotation of the coupling ball around the joint ball, about the vertical axis or about a number of axes, one of which in particular is the vertical axis. Advantageously, the magnet and the magnetic-field-sensitive sensor are so orientated relative to one another that the magnetic-field-sensitive sensor can detect rotation of the coupling ball around the joint ball, about the vertical axis and about one, about at least one, for example two or three, about several, or about any number of other axes, which preferably do not coincide with the vertical axis and in particular which pass through the mid-point of the joint ball and/or through the mid-point of the coupling ball. For example, by means of the magnetic-field-sensitive sensor the orientation of the field lines of the magnetic field can be detected. Preferably the first component comprises or is the magnet and the second component preferably comprises or is the magnetic-field-sensitive sensor. In particular, the magnet is a permanent magnet. In this way there is no need to run electric leads to the magnet. The magnet can have a rod-like, cylindrical, square, disc, annular, spherical or any other suitable shape.

The first component is for example arranged on or in the coupling ball. For example, the first component is arranged on or in the wall that delimits the hollow space of the coupling ball and/or integrated in the coupling ball. If a bearing shell is present, the first component can also be arranged on or in the bearing shell, in particular in the wall thereof. Moreover, the second component is arranged on or in the joint ball and/or the end area of the ball support. For example, the second component is integrated in the joint ball.

In accordance with a usual standard the coupling ball has an outer diameter of 50 mm. Thus, the hollow space is relatively small so that due to the limited fitting space available the arrangement of the components within the coupling ball can be complicated. Accordingly, it is desirable to arrange the angle detection device outside the hollow space and/or a distance away from the bearing surfaces of the ball joint in sliding contact with one another.

Thus, the angle detection device is preferably arranged a distance away from the coupling ball, in particular outside the coupling ball. Preferably, the angle detection device is arranged in the area of the interface of the ball support and the holder. That interface is in particular located at or in the area of the ball support housing. Thus, the angle detection device is advantageously arranged in the ball support housing. For example, the first component of the angle detection device is arranged and/or fixed in the area of an end of the ball support or pin remote from the joint ball. In particular, the first component of the angle detection device is arranged and/or fixed in the area of an end of the ball support housing or pin that faces toward the holder and/or the ball support. Advantageously, the second component of the angle detection device is arranged and/or fixed on the holder, in particular in the ball support housing.

If the ball support is connected detachably with the holder and if the electric leads of the angle detection device run from the ball support to the holder, then at the interface of the ball support and holder a separable electric connection is preferably provided, in particular in the form of an electric plug connection, by way of which the leads are extended. Thus, the ball support can be removed from the holder by pulling apart the electric connection. The electric connection can in particular be omitted if no electric leads of the angle detection device run from the ball support to the holder. For example this is possible when the angle detection device operates without contact and its second component is located on the holder.

In a further development, the trailer towing device comprises a shaft that connects the coupling ball to the angle detection device. This makes it possible to position the angle detection device outside the hollow space and/or a distance away from the bearing surfaces of the ball joint. Preferably, the angle detection device is arranged in the area of or close to the end of the ball support remote from the joint ball. The shaft is in particular connected firmly, preferably solidly or in a rotationally fixed manner to the coupling ball. Advantageously, the shaft is fixed to the wall of the coupling ball that delimits the hollow space. Preferably, the shaft connects the coupling ball to the first component of the angle detection device. The shaft preferably extends in the direction of the vertical axis and in particular can be rotated about the vertical axis. Advantageously, the rotational axis of the shaft coincides with the vertical axis.

Tilting of the coupling ball, i.e. rotation of the coupling ball around the joint ball about an axis that does not coincide with the vertical axis and in particular which passes through the mid-point of the joint ball and/or the coupling ball, can have the result that the rotational axis of the shaft no longer coincides with the vertical axis. This brings the risk that the function of the angle detection device may be impaired and/or that the shaft is permanently deformed and/or kinked. Preferably therefore, the shaft is completely flexible or at least flexible in a flexible area, in particular one that is made flexible and/or elastic, and it can therefore also be referred to as a flexible shaft. In this way the shaft can bend in the area so as to follow the tilting of the coupling ball. In addition or alternatively the shaft is hinged in at least one area and can also be called a hinged shaft. Thus, by deflection of the area the shaft can follow the tilting of the coupling ball. For example the shaft is designed as a hinged shaft, in particular having one or more hinges, and/or is made in several articulated parts. When the coupling ball is not tilted, the shaft is preferably straight and extends in the direction of the vertical axis. When the shaft bends and/or is deflected, its length in particular in the direction of the vertical axis changes, and this can for example be allowed for in the mounting of the shaft. Preferably this change can be detected by the angle detection device or by means of an additional sensor. This makes it possible to determine the angle through which the coupling ball has tilted around the joint ball. The angle is also called the tilt angle. By virtue of the magnetically operating angle detection device tilting of the coupling ball can be detected since the distance between the magnet and the magnetic-field-sensitive sensor changes. If the shaft is a flexible shaft, then by means of it the coupling ball can preferably be moved back to a reference position after rotating and/or tilting.

According to a further development a recess is provided in the ball support, preferably a through-going recess. In particular the recess extends in the direction of the vertical axis. Preferably the shaft between the coupling ball and the angle detection device extends into, essentially into, or at least partially into the recess. In particular the shaft in the recess is fitted to rotate about the vertical axis and/or guided to move in the direction of the vertical axis. Preferably the recess is made wider in its end area closer to the coupling ball, through which in particular the flexible and/or hinged part of the shaft extends. Preferably the widened end area of the recess is conical, tapering down in particular with increasing distance from the coupling ball. The widened end area provides the flexible and/or hinged shaft with enough room to be able to follow any tilting of the coupling ball. Advantageously, the amount of the shaft length change caused by its bending and/or deflection in the vertical direction can be influenced selectively by the position of the shaft mounting and the recess.

The angle detection device is preferably connected to an evaluation device by means of which the articulation angle of the tractor-trailer combination can be determined. The evaluation device can be combined with the angle detection device, or provided separately from it. In the latter case the evaluation device is for example arranged in the tractor vehicle. However, relative movement between the coupling lock and the coupling ball can interfere with the determination of the articulation angle. But since a relative movement between the coupling lock and the coupling ball preferably takes place only rarely, the risk of such interference with the articulation angle determination is quite low.

In a further development the trailer towing device comprises one or more stops by means of which stop or stops tilting of the coupling ball around the joint ball can be limited. The stop or stops serve in particular to protect the angle detection device and/or the shaft. The stop or stops are for example provided on the ball support and/or on the holder, so that the coupling ball can come up against it or them. In addition or alternatively, the stop or stops are provided for example on the coupling ball and/or on the locking element and/or on the bearing shell, in particular on its neck, so that the coupling ball with the stops can come up against the ball support and/or the holder. If the coupling ball tilts by an angle such that the stop or one of the stops becomes effective, that angle is denoted as the stop angle or critical tilt angle. For different tilt directions the critical tilt angle can be the same or different. In particular, reaching of the critical tilt angle, or one of them, can be detected by means of the angle detection device and/or the additional sensor. If the coupling ball tilts by a critical tilt angle, then movement of the coupling lock relative to the coupling ball can take place. Such a relative movement can possibly interfere with the determination of this tilt angle and/or the articulation angle. However, the interference can be corrected by computer means, in particular by means of the evaluation device. Since despite the stops tilting of the coupling ball by a defined amount is preferably basically possible, this eventuality occurs relatively rarely. Advantageously, the stop or stops are in each case external stops.

In a further development, the trailer towing device comprises a locking device by means of which the joint ball can be locked onto the coupling ball. If the joint ball is locked onto the coupling ball, rotation of the coupling ball around the joint ball is blocked. This is appropriate if a bike support such as a motorcycle carrier is to be coupled to the coupling ball. The locking device can preferably be actuated in such manner that the locking of the joint ball to the coupling ball can be released again. If the ball support is connected detachably to the holder, for fitting the bike carrier it is alternatively possible to replace the ball support together with the coupling ball by a solid unit, in particular one that cannot tilt or be deflected, to which the bike carrier is fixed. For that purpose the unit is connected firmly, preferably solidly to the holder and/or fixed in the ball support housing. The holder can also be connected detachably to the tractor vehicle. In that case the holder together with the ball support and the coupling ball can be replaced by a solid unit, in particular one which cannot tilt or be deflected, to which the bike carrier can be fixed.

BRIEF DESCRIPTION OF THE DRAWINGS

Below, the invention is described with reference to preferred embodiments illustrated in the drawing, which shows.

DETAILED DESCRIPTION OF THE PREFERRED EMBODIMENTS

Figure 1:
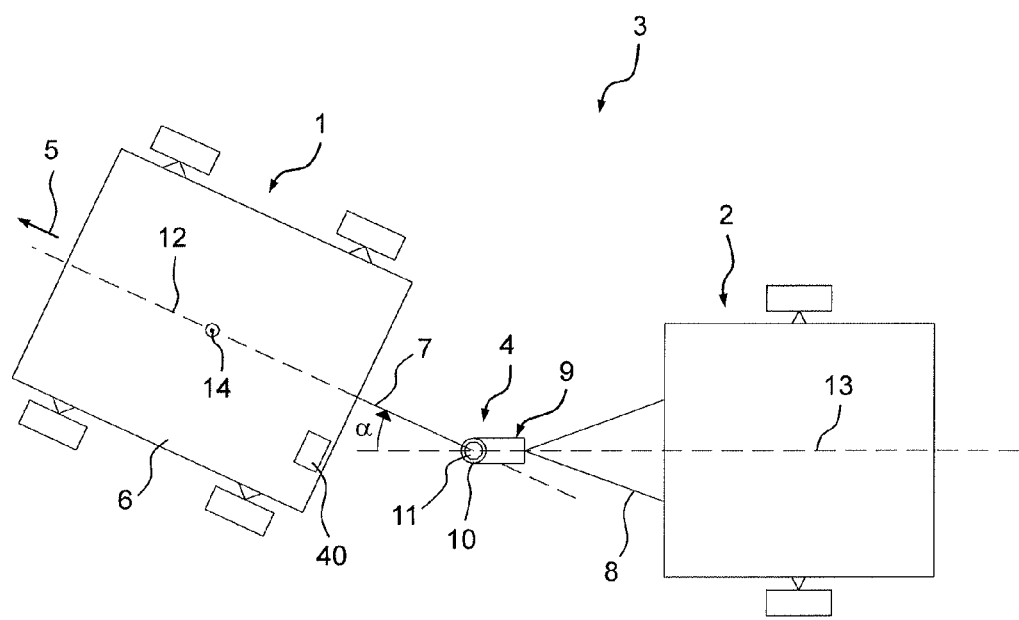
FIG. 1: A schematic overhead view of a combination consisting of a trailer vehicle and a tractor vehicle, which comprises a trailer towing device according to a first embodiment.

FIG. 1 shows a view from above, of a combination 3 consisting of a tractor vehicle 1 and a trailer vehicle 2, wherein the tractor vehicle 1 is articulated to the trailer vehicle 2 by means of a first embodiment of a trailer towing device 4. The usual forward-driving direction of the combination 3 is indexed 5. The trailer towing device 4 comprises a holder 7 in the form of a coupling arm which is solidly connected to the vehicle body or chassis 6 of the trailer vehicle. In addition a coupling lock 9 is fixed to a tow-bar 8 of the trailer vehicle 2, which comprises a ball seating 10 into which fits a schematically represented coupling ball 11 arranged at an end of the coupling arm 7 at the rear relative to the driving direction 5. The coupling lock 9 forms a front end of the tow-bar 8 in the driving direction 5.

The angle $\alpha$ between the longitudinal axis 12 of the tractor vehicle 1 and the longitudinal axis 13 of the trailer vehicle 2 forms the so-termed articulation or combination angle. In particular the articulation angle $\alpha$ is in a plane perpendicular to the vertical direction 14 of the tractor vehicle 1, so that in FIG. 1 the vertical direction 14 of the vehicle is perpendicular to the plane of the drawing.

Figure 2:
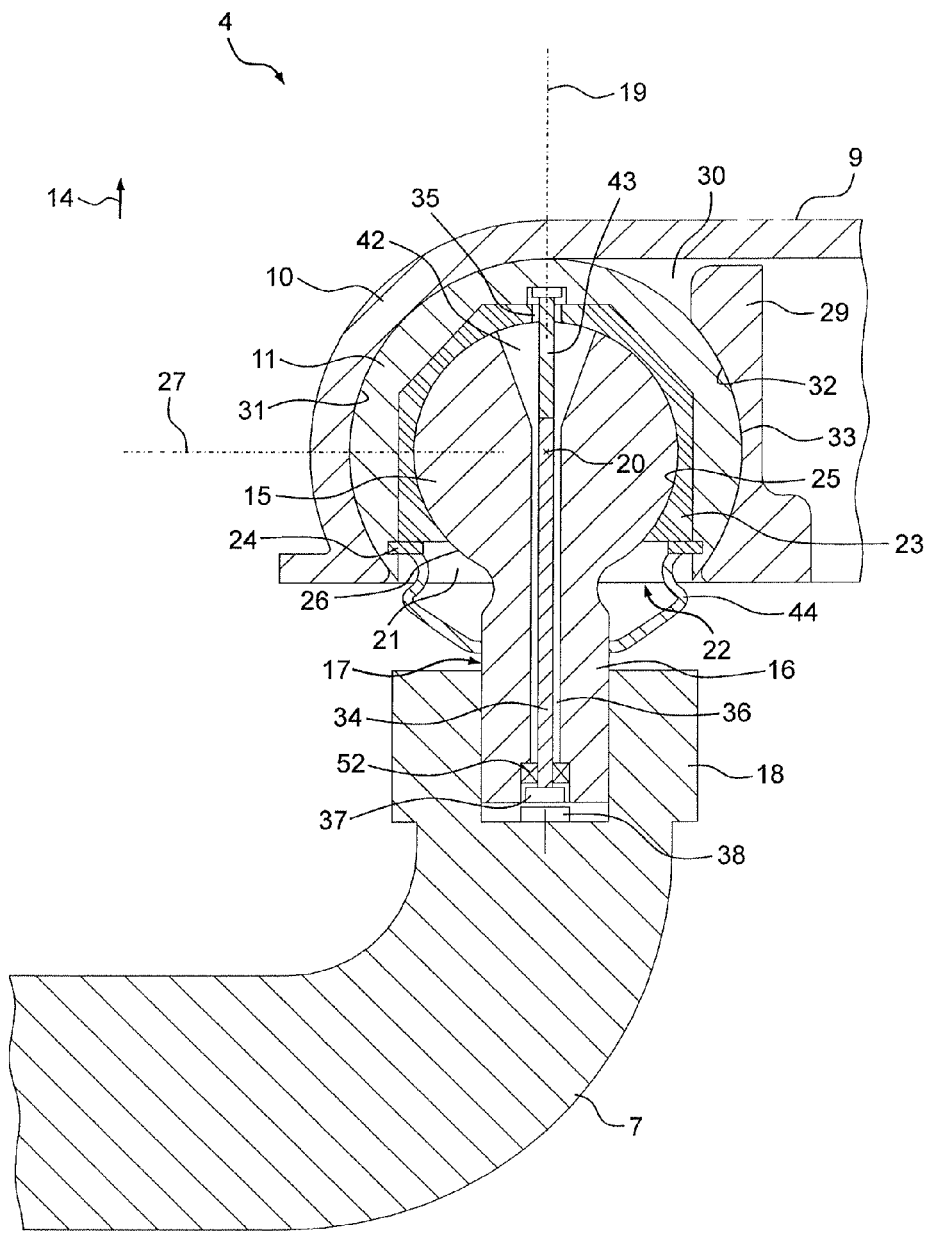
FIG. 2: A partial sectioned view of the trailer towing device shown in FIG. 1, FIG. 3: The sectioned view of FIG. 2, without the coupling lock and coupling arm.

FIG. 2 shows a schematic sectioned view of the trailer towing device 4 along the longitudinal axis 12 and in the vertical direction 14 of the vehicle, wherein a ball support 17 comprising a joint ball 15 and a pin 16 and designed as a ball pin is fixed with its pin 16 in a ball support housing 18 which is provided at the end of the coupling arm 7 and is connected solidly thereto. The housing 18 is in particular associated with the coupling arm 7. The ball pin 17 is connected solidly to the housing 18 and extends out of the housing 18 in the direction of a vertical axis 19 which passes through the mid-point of the joint ball 15. The coupling ball 11 has a hollow space 21 and an opening 22 through which the hollow space 21 is accessible. In the hollow space 21 there is a bearing shell 23 which is fixed in the hollow space 21 by means of an annular locking element 24, which is secured on the coupling ball 11 by positive interlock.

The ball pin 17 engages through the opening 22 in the hollow space 21 and sits with its joint ball 15 in the bearing shell 23, which encloses the joint ball 15 and has a hollow-ball-shaped bearing surface 25 against which the joint ball 15 is in contact and can slide with its spherical outer surface 26. Thus, the coupling ball 11 is mounted and can move on the joint ball 15 of the ball pin 17 with the bearing shell 23 between them, so that the ball pin 17, the bearing shell 23 and the coupling ball 11 together form a ball joint (see FIG. 3) which has three rotational degrees of freedom. Thus, the coupling ball 11 can rotate around the joint ball 15 about the vertical axis 19. In addition the coupling ball 11 can rotate around the coupling ball 11 about any other axes which pass through the mid-point of the joint ball 15 and do not coincide with the vertical axis 19. One of these axes is shown in FIG. 2 and indexed 27, the axis 27 extending in the direction of the longitudinal axis 12 of the tractor vehicle 1. Rotation of the coupling ball 11 around the joint ball 15 about an axis which passes through the mid-point 20 of the joint ball 15 and does not coincide with the vertical axis 19 is referred to as tilting.

The coupling ball 11 sits in the ball seating 10 and is positively secured therein by a clamping element 29 that can be actuated. The recess provided in the coupling lock 9 and delimited by the ball seating 10 and by the clamping element 29, in which the coupling ball 11 sits, is indexed 30 and has concave bearing surfaces 31 and 32 of which the surface 31 is a bearing surface of the ball seating 10 and the surface 32 is a bearing surface of the clamping element 29 associated with the coupling lock 9. In addition the coupling ball 11 has a convex bearing surface 33 which is in contact with the bearing surfaces 31 and 32. The surfaces 31, 32 and 33 of the coupling lock 9 and the coupling ball 11 in mutual contact are in each case spherical surfaces so that rotation, in particular any or all rotation of the coupling lock 9 about the mid-point of the coupling ball 11 relative to the latter is basically possible. Preferably, however, the clamping element 29 presses against the coupling ball 11 sufficiently hard to prevent any rotation of the coupling lock 9 relative to the coupling ball 11 by friction. The mid-point of the coupling ball 11 coincides with the mid-point 20 of the joint ball 15.

On the wall 54 of the coupling ball 11 that delimits the hollow space 21 (see FIG. 3) is fixed a shaft 34 which extends through a through-hole 35 in the bearing shell 23 and into a through-going recess 36 provided in the ball pin 17, which extends in the direction of the vertical axis 19 such that the vertical axis defines a longitudinal central axis of the recess 36. The shaft 34 can rotate about the vertical axis 19 and can be displaced along it in the recess 36, guided by at least one bearing 52. In the position of the coupling ball 11 shown in FIG. 2, which in particular defines a reference position, the vertical axis 19 passes through the point at which the shaft 34 is fixed to the coupling ball 11. Moreover, in the reference position the through-hole 35 extends in the direction of the vertical axis 19. Tilting of the coupling ball 11 is preferably relative to this reference position, so that in its position shown in FIG. 2 the coupling ball 11 is not tilted.

Figure 3:
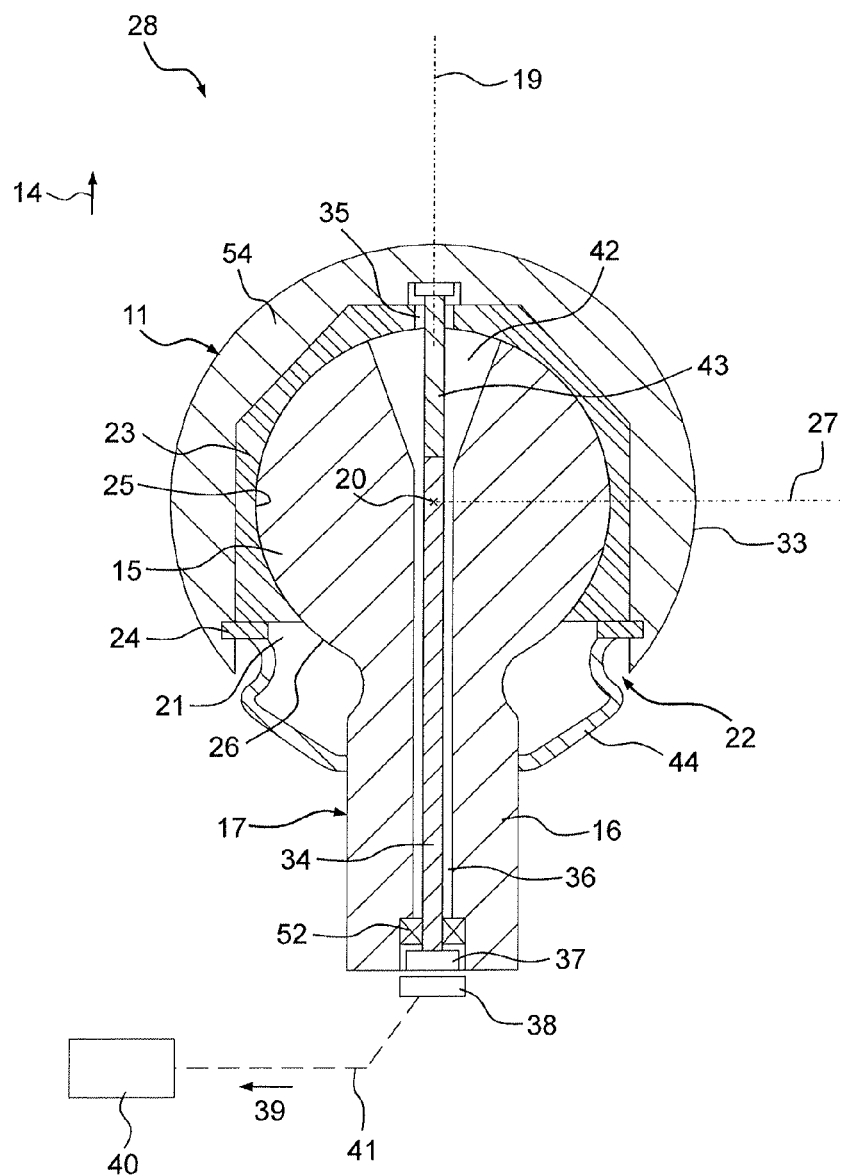

FIG. 3 shows a schematic sectioned view of the ball joint 28 wherein, in the area of the ball pin 17 remote from the joint ball 15, the shaft 34 is firmly connected to a permanent magnet 37 which, together with the coupling ball 11, can rotate about the vertical axis 19 relative to the ball pin 17 and to the coupling arm 7. In particular, the magnet 37 is magnetized transversely to the vertical axis 19. Under the magnet 37 and a distance away from it a magnetic-field-sensitive sensor 38 is arranged in the housing 18 and fixed on the coupling arm 7 (see also FIG. 2). The magnetic field of the magnet 37 passes through the sensor 38 so that the sensor 38 can detect rotation of the magnet 37 relative to the housing 18. For example the magnetic-field-sensitive sensor 38 comprises one or more Hall sensor elements and/or one or more magneto-resistive sensor elements. A signal 39 emitted by the sensor 38, which carries information about the rotational angle $\alpha$ of the coupling ball 11 relative to the ball pin 17, is passed to an evaluation device 40 connected by electric leads 41 to the sensor 38. On the basis of the signal 39 the evaluation unit 40 calculates the articulation angle $\alpha$ between the tractor vehicle 1 and the trailer vehicle 2. Thus, the magnet 37 and the magnetic-field-sensitive sensor 38 form an angle detection device. The evaluation device 40 is in particular arranged in the tractor vehicle 1 (see FIG. 1).

In its end area 42 close to the coupling ball 11 the recess 36 widens out conically. Moreover, in its end area 43 close to the coupling ball 11 the shaft 34, which extends through the conical area 42, is made flexible. This enables the coupling ball 11 to tilt around the joint ball 15 since when the coupling ball 11 tilts, the flexible area 43 can bend within the end area 42, in particular elastically. Due to the bending of the end area 43 the shaft 34 is displaced within the recess 36 in the direction of the vertical axis 19, so that the distance between the magnet 37 and the magnetic-field-sensitive sensor 38 changes. This distance change can also be detected by the magnetic-field-sensitive sensor 38, so that a tilting of the coupling ball 11 can be detected by the angle detection device.

Onto the closure element 24 a sealing bellows 44 is attached, in particular vulcanized, which contacts the pin 16 of the ball pin 17, surrounding it to form a seal. However, the sealing bellows 44 can also be fixed, in particular vulcanized, onto the bearing shell 23 or onto the coupling ball 11.

Figure 4:
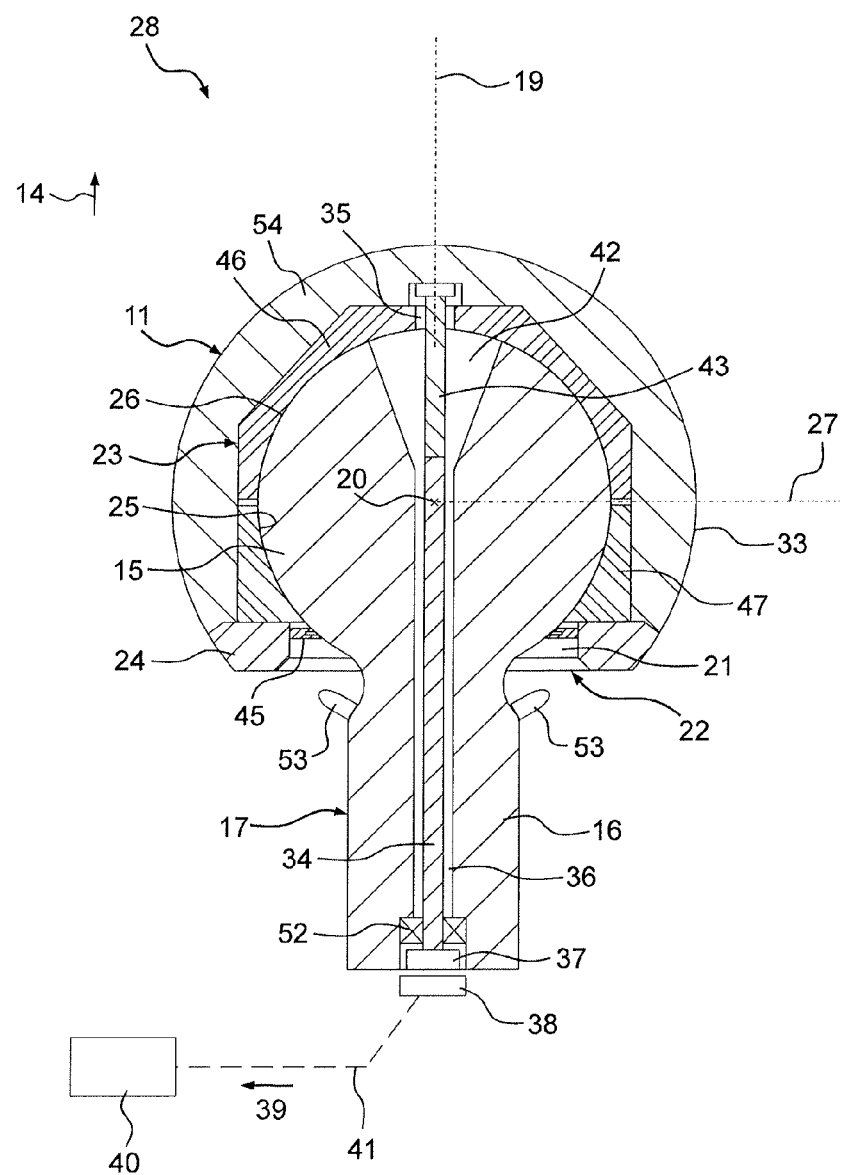
FIG. 4: A sectioned view of a trailer towing device according to a second embodiment.

FIG. 4 shows a sectioned view of a second embodiment of a ball joint 28 of a trailer towing device, in which features similar or identical to those of the first embodiment are given the same indexes as in the first embodiment. Otherwise than in the first embodiment, a sealing lip 45 is fixed, in particular vulcanized onto the closure element 24, which surrounds the joint ball 15 and makes sealing contact with it. Thus the sealing bellows 44 provided in the first embodiment can be omitted. Furthermore the bearing shell 23 is made in two parts and comprises two separate bearing shell components 46 and 47. In particular, on the ball pin 17 schematically represented stops 53 are provided, by means of which tilting of the coupling ball 11 can be limited. Apart from these differences the second embodiment is essentially the same as the first embodiment, so that for a further description of the second embodiment reference should be made to the description of the first embodiment. In particular, the ball joint 28 according to the second embodiment can be used in place of the ball joint according to the first embodiment.

Figure 5:
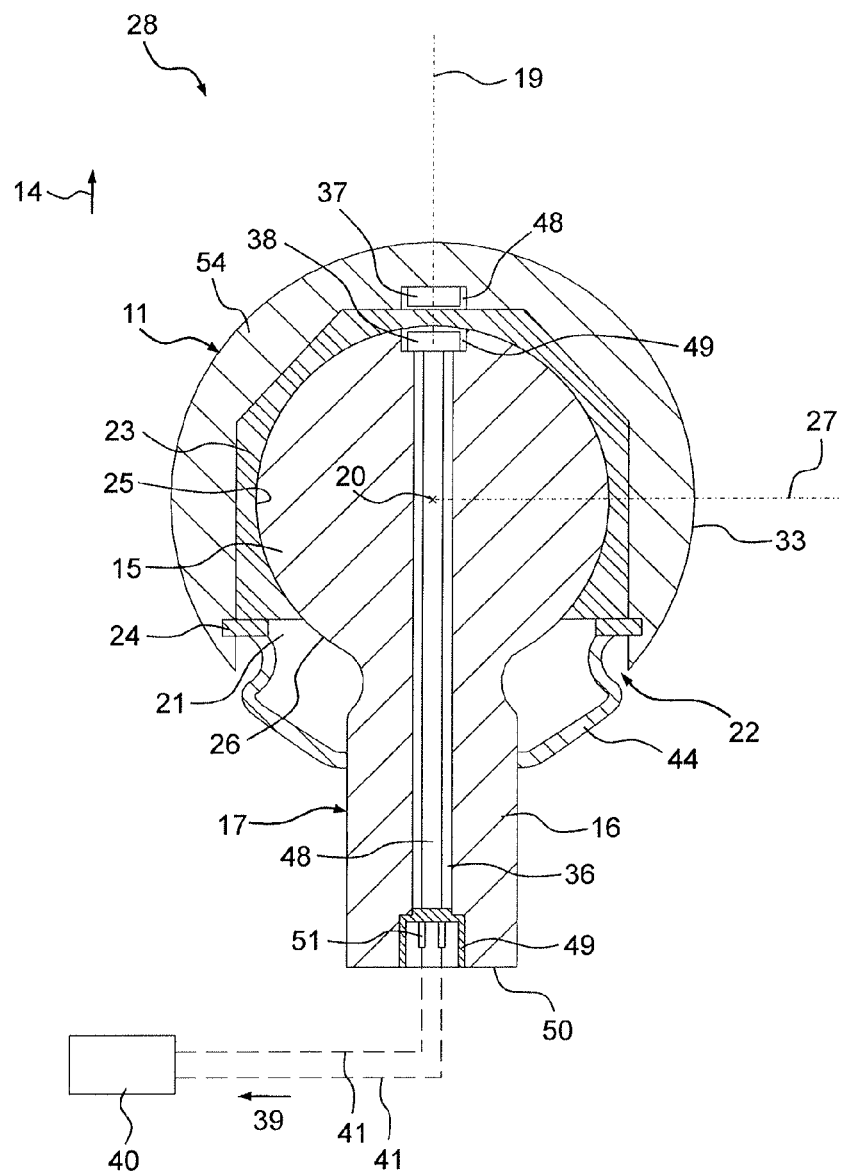
FIG. 5: A sectioned view of a trailer towing device according to a third embodiment.

FIG. 5 shows a sectioned view of a third embodiment of a ball joint 28 of a trailer towing device, in which features similar or identical to those of the first embodiment are given the same indexes as in the first embodiment. Otherwise than in the first embodiment, the permanent magnet 37 is held in a recess 48 provided in the wall 54 of the coupling ball that delimits the hollow space 21, whereas the magnetic-field-sensitive sensor 38 is held in a recess 49 provided in the joint ball 15, which is formed in the outer surface 26 of the joint ball 15. Electric leads 48 extend through the recess 36 provided in the ball pin 17 and connect the sensor 38 to a plug connector 49 arranged in the end area 50 of the ball pin 17 remote from the joint ball 15 and attached thereto. The electric contacts 51 of the plug connector 49 are electrically connected, via electric leads 41, to an evaluation device 40, for which purpose the electric leads 41 are preferably connected to a counterpart connector which plugs into the plug connector 49. In this third embodiment the angle detector device formed by the magnet 37 and the sensor 38 is arranged in the hollow space 21. In particular, the shaft 34 in the first embodiment can be omitted. Consequently, so also can the hole 35 in the bearing shell 23 and the conical area 42 of the recess 36, so that the latter can be made as a simple bore of constant diameter. Apart from these differences the third embodiment is essentially the same as the first embodiment, so that for any further description of the third embodiment reference should be made to the description of the first embodiment. In particular, the ball joint 28 according to the third embodiment can be used in place of the ball joint according to the first embodiment.

Figure 6:
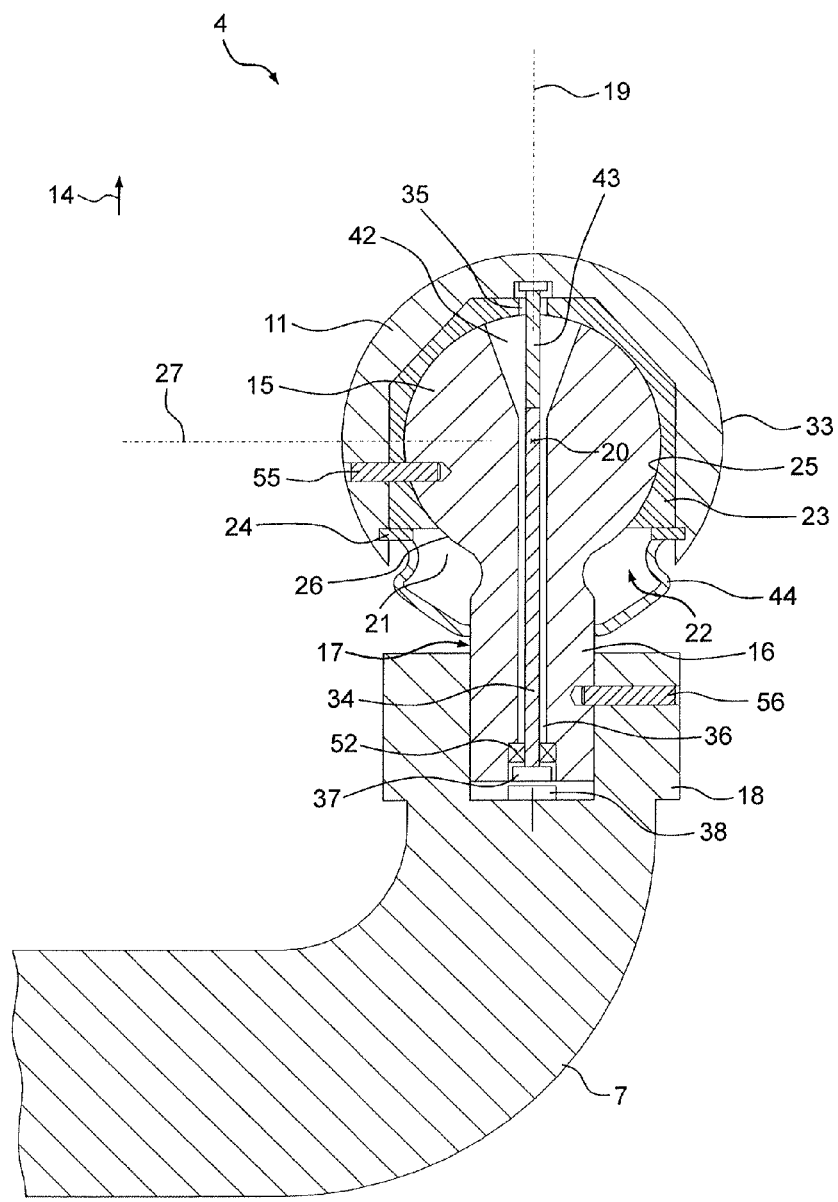
FIG. 6: A sectioned view of a trailer towing device according to a fourth embodiment.

FIG. 6 shows a sectioned view of a fourth embodiment of a trailer towing device 4, in which features similar or identical to those of the first embodiment are given the same indexes as in the first embodiment. Otherwise than in the first embodiment, a locking device is provided by means of which the joint ball 15 can be locked to the coupling ball 11. The locking device comprises at least one bolt 55, which fits both into a bore in the coupling ball 11 and into a bore in the joint ball 15. Preferably, the bolt is a screw-bolt which is screwed into the coupling ball 11 and/or into the joint ball 15. In the locked condition illustrated, for example, a bicycle carrier can be fixed onto the coupling ball 11. To release the lock, the bolt 55 is disengaged from at least one of the bores, in particular from the bore provided in the joint ball 15. In addition a bolt 56 is shown, which fits both into a bore in the ball support housing 18 and into a bore in the ball support 17. Preferably the bolt 36 is a screw-bolt, which is screwed in to the ball support housing 18 and/or into the ball support 17. When the bolt 56 is disengaged from the bore provided in the ball support 17, the ball support 17 together with the coupling ball 11 can be taken off the coupling arm 7. Apart from these differences the fourth embodiment is essentially the same as the first embodiment, so that for any further description of the fourth embodiment reference should be made to the description of the first embodiment.

INDEXES

1 Tractor vehicle
2 Trailer vehicle
3 Tractor-trailer combination
4 Trailer towing device
5 Driving direction of the combination
6 Chassis/vehicle body of the tractor vehicle
7 Holder/coupling arm
8 Tow-bar of the trailer vehicle
9 Coupling lock
10 Ball seating
11 Coupling ball
12 Longitudinal axis of the tractor vehicle
13 Longitudinal axis of the trailer vehicle
14 Vertical axis of the tractor vehicle
15 Joint ball
16 Pin
17 Ball pin/ball support
18 Ball support housing
19 Vertical axis
20 Mid-point of the joint ball
21 Hollow space in the coupling ball
22 Opening in the coupling ball
23 Bearing shell
24 Locking element
25 Bearing surface of the bearing shell
26 Outer surface of the joint ball
27 Axis
28 Ball joint
29 Clamping element
30 Recess in the coupling lock
31 Bearing surface of the ball seating
32 Bearing surface of the clamping element
33 Bearing surface of the coupling ball
34 Shaft
35 Hole in the bearing shell
36 Recess in the ball pin
37 Magnet
38 Magnetic-field-sensitive sensor
39 Electric signal from the sensor
40 Evaluation device
41 Electric leads
42 Conical end area of the recess
43 Flexible area of the shaft
44 Sealing bellows
45 Sealing lip
46 Bearing shell portion
47 Bearing shell portion
48 Electric leads
49 Plug connector
50 End of the ball pin
51 Electric contacts of the plug connector
52 Bearing
53 End-stop
54 Wall of the coupling ball
55 Bolt of the locking device
56 Bolt
α Articulation angle

The invention claimed is:

1. A trailer towing device for a tractor vehicle (1), the trailer towing device comprising:
 a coupling ball (11) comprising a hollow space (21) for coupling a trailer vehicle (2);
 a ball support (17) having an end area which engages the hollow space (21) through an opening (22) provided in the coupling ball (11) and supports the coupling ball (11);
 the end area of the ball support (17) comprising a joint ball (15) on which the coupling ball (11) is fitted and rotatable so that, together with the coupling ball (11), the joint ball forms a ball joint (28), the joint ball (15) being rotatable with respect to the trailer vehicle;
 when coupled to a ball seat (10), the joint ball (15) is rotatable with respect to both the ball seat (10) and the coupling ball (11); and the joint ball (15) is lockable, via a locking device (55), to the coupling ball (11);
an angle detection device which detects rotation of the coupling ball (11), relative to the ball support, about at least a vertical axis; and
a shaft is rotatable about the vertical axis and connects the coupling ball to the angle detection device.

2. The trailer towing device according to claim 1, wherein the angle detection device is arranged inside the ball joint (28), the joint ball and the coupling ball are rotatable with respect to the trailer vehicle.

3. The trailer towing device according to claim 1, wherein the angle detection device comprises a first component, either connected to or provided on the coupling ball (11), and a second component, either connected to or provided on the ball support (17), which interacts with the first component.

4. The trailer towing device according to claim 3, wherein one of the first and the second components comprises a magnet (37) and another of the first and the second components comprises a magnetic field sensitive sensor (38), through which a magnetic field of the magnet (37) passes.

5. The trailer towing device according to claim 1, wherein a seal (44; 45) is arranged in an area of the opening (22), and the seal (44; 45) extends between the ball support (17) and one of the coupling ball (11), a bearing shell (23) and a closure element (24).

6. The trailer towing device according to claim 1, wherein the ball support is attachable to either a vehicle body or a chassis (6) of the tractor vehicle (1).

7. The trailer towing device according to claim 1, wherein a coupling lock (9) of the trailer vehicle (2) is couplable to the coupling ball (11), and the joint ball and the coupling ball are rotatable with respect to each other and the coupling lock.

8. The trailer towing device according to claim 1, wherein a ball support housing (18) is lockable, via a bolt (56), to the ball support (17).

9. The trailer towing device according to claim 1, wherein the angle detection device detects rotation of the coupling ball (11), relative to the ball support (17), about the vertical axis (19) and at least one other axis.

10. A trailer towing device for a tractor vehicle (1), the trailer towing device comprising:
a coupling ball (11) comprising a hollow space (21) for coupling a trailer vehicle (2);
a ball support (17) for engaging with an end area in the hollow space (21) through an opening (22) provided in the coupling ball (11) and supporting the coupling ball (11);
an end area of the ball support (17) comprising a joint ball (15) on which the coupling ball (11) is fitted and rotatable so that, together with the coupling ball (11), the joint ball forms a ball joint (28);
an angle detection device which detects rotation of the coupling ball (11), relative to the ball support (17), about at least a vertical axis (19); and
a shaft (34) is rotatable about the vertical axis (19) and connects the coupling ball (11) to the angle detection device.

11. The trailer towing device according to claim 10, wherein at least one area (43) of the shaft (34) is either flexible or articulated.

12. The trailer towing device according to claim 11, wherein when a length of the shaft, in a direction of the vertical axis (19), changes as the shaft (34) either bends or is deflected, and the change of length of the shaft is detected by either the angle detection device or by an additional sensor.

13. The trailer towing device according to claim 12, wherein a tilt angle is determinable from the change of length of the shaft, by which the coupling ball (11) rotates around the joint ball (15) about an axis that does not coincide with the vertical axis (19).

14. The trailer towing device according to claim 10, wherein the shaft (34), between the coupling ball (11) and the angle detection device, extends at least partially through a recess (36) provided in the ball support (17).

15. The trailer towing device according to claim 14, wherein the recess (36) has an end area (42) close to the coupling ball (11) at which the recess increases in area, and either a flexible or an articulated area (43) of the shaft (34) extends through the increased area.

16. A trailer towing device for a tractor vehicle (1), the trailer towing device comprising:
a coupling ball (11), which comprises a hollow space (21), for coupling a trailer vehicle (2) to the tractor vehicle;
a ball support (17) having an end area which engages in the hollow space (21) through an opening (22) provided in the coupling ball (11) and which supports the coupling ball (11);
the end area of the ball support (17) comprising a joint ball (15) on which the coupling ball (11) is fitted and rotatable so that, together with the coupling ball (11), the joint ball forms a ball joint (28); and
a bearing shell (23) surrounds the joint ball (15) and has a hollow-ball-shaped bearing surface (25) against which the joint ball (15) engages and slides, and
the bearing shell (23) surrounds the ball support,
the ball joint is received within a ball seat such that, when coupled to the ball seat, the joint ball is rotatable with respect to both the ball seat and the coupling ball and a sliding friction between the joint ball and the coupling ball is less than a sliding friction between the coupling ball and the ball seat, and
the joint ball (15) is lockable, via a locking device (55), to the coupling ball (11);
an angle detection device which detects rotation of the coupling ball (11), relative to the ball support (17), about at least a vertical axis (19); and
a shaft (34) is rotatable about the vertical axis (19) and connects the coupling ball (11) to the angle detection device.

17. The trailer towing device according to claim 16, wherein
the angle detection device is arranged inside the ball joint (28).

18. The trailer towing device according to claim 16, wherein the angle detection device comprises a first component, either connected to or provided on the coupling ball (11), and a second component, either connected to or provided on the ball support (17), which interacts with the first component; and
one of the first and the second components comprises a magnet (37) and another of the first and the second components comprises a magnetic field sensitive sensor (38), through which a magnetic field of the magnet (37) passes.

* * * * *